July 2, 1929.  B. F. SEYMOUR  1,719,382
SHOCK ABSORBING TRANSMISSION
Filed Aug. 9, 1926
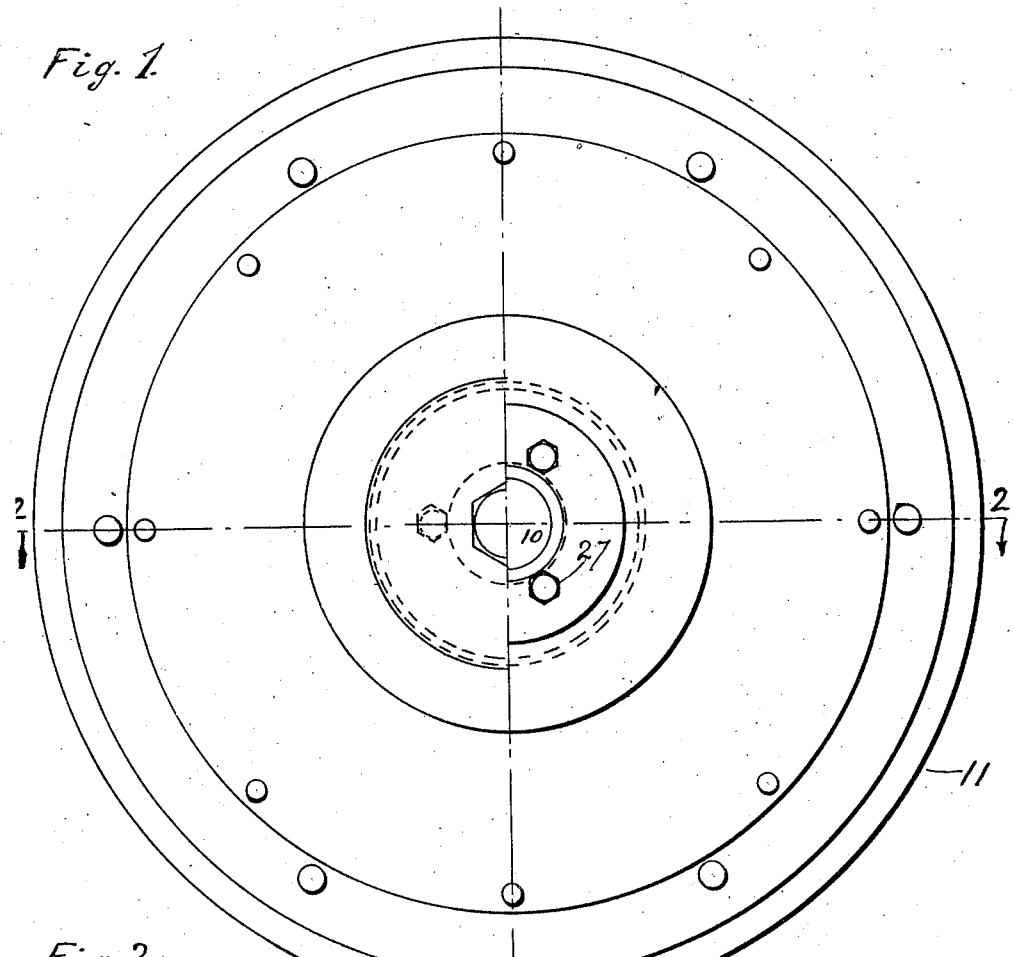
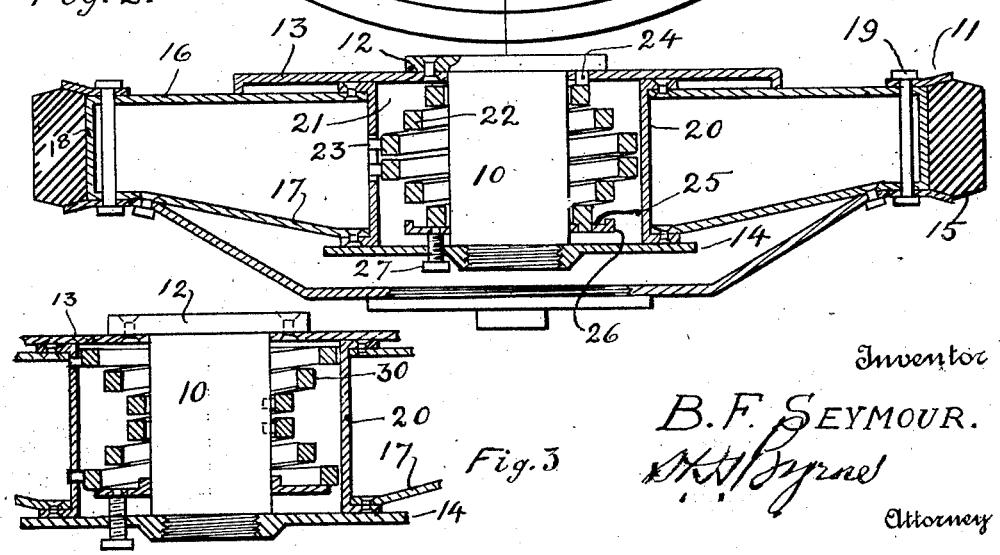
Inventor
B. F. SEYMOUR.
Attorney Patented July 2, 1929.

1,719,382

UNITED STATES PATENT OFFICE.

BENJAMIN F. SEYMOUR, OF WASHINGTON, DISTRICT OF COLUMBIA.

SHOCK-ABSORBING TRANSMISSION.

Application filed August 9, 1926. Serial No. 128,271.

My invention relates to a shock absorbing transmission or, in other words, the yieldable means transferring power from the driving to the driven elements is connected to both so that if either element experiences a shock the latter is substantially completely absorbed by the transmission means without affecting the other.

In the drawing the device has been illustrated as applied to a vehicle wheel when the hub constitutes the driving element and the wheel rim the driven element, but it is evident that many other applications of the invention are possible. For instance, if the driving element were a large gear wheel or a pulley transmitting power through the shock absorbing transmission to a drive shaft, the conditions would be reversed and the hub in the drawing would be replaced by a shaft as the driven element.

In the accompanying drawing the invention has been illustrated as applied to a vehicle wheel.

Figure 1 represents a side elevation with some parts removed;

Figure 2 a horizontal section along line 2—2 of Figure 1; and

Figure 3 a fragmentary section similar to Figure 2 showing a slightly modified form of transmission.

In the drawing reference numeral 10 represents the driving element, here given the form of a wheel hub and numeral 11 represents the driven element, which here is given the form of a wheel rim, the whole representing a vehicle wheel.

To the hub-flange 12 is secured in any suitable manner the inner side plate 13. The outer side plate 14 is threaded or otherwise firmly secured on the outer end of the hub, so that both the outer and the inner side plates are fixedly connected with the hub partaking in its motion.

The wheel rim may be provided with a tire 15 secured around the periphery of the rim body which consists of an inner annular member 16 and an outer annular member 17 cross-connected as at 18 to form a cylindrical base for the tire. Bolts 19 may be used for easy attachment and detachment of the tire.

The rim body supports and is rigidly secured to a central, hollow drum 20, to form an integral part therewith. The flanged ends of the drum have sliding engagement with the hub side plates 13 and 14 in order to be sustained in upright position or perpendicular to the axis of the hub 10. As the inside diameter of the drum 20 is considerably greater than that of the hub 10, an annular spring chamber 21 is thus formed between them. This chamber contains the shock absorbing transmission in the form of one or more coiled springs 22 of volute or double conical shape with the largest diameter in the middle and the smallest at the ends as seen in Figure 2. The middle portion is firmly connected with the drum 20 as at 23 and the inner end as at 24 secured to the hub plate 13 while the outer end is secured as at 25 to an adjusting cup 26. By means of screws 27 threaded in the outer hub plate 14 the cup may be axially displaced on the hub and thus the compression of the springs 22 for a desired load may be accomplished.

When now the driving member or hub 10 revolves, this motion is communicated through the transmission member 22 to the drum 20 and the driven member or wheel rim 11. Any shocks experienced either by the driving or the driven members will evidently be taken up by the yielding transmission member 22.

Instead of constructing the transmission member 22 as shown in Figure 2 with the largest diameter in the middle, I may reverse the condition and have the largest diameter at the ends and the smallest in the middle as shown at 30 in Figure 3.

I wish here to refer to some of my copending applications as being somewhat related to this and in connection with which this device may be used, namely:

Serial No. 537,251, patented March 8, 1927, No. 1,620,136, combined resilient transmission and bearing.

Serial No. 717,401, patented August 2, 1927, No. 1,637,392, combined resilient transmission and bearing.

Serial No. 664,632, patented September 27, 1927, No. 1,643,682, combined resilient transmission and drive.

It is to be understood that those skilled in the art may vary the details of construction and arrangement of parts without departing from the spirit of my invention, and therefore I do not wish to be limited to such features except as may be required by the claims.

It should be noted that when the device is incorporated on a vehicle wheel, a load on the hub will cause its axis to be out of alinement with the rim axis or in other words that the transmission member or spring 22 will be eccentric as regards the rim axis.

I claim:

1. A shock absorbing transmission adapted to a vehicle wheel, comprising a compression means, driving and driven members and an intervening double conical spring, the ends of said spring being non-rotatably secured to one of said members and the approximate center of said spring being non-rotatably secured to the other of said members, said compression means including an annular shield engaging one end of said spring, and adjusting screws for the shield carried by one of said members.

2. A shock absorbing transmission for a vehicle wheel, comprising a driving member, a driven member, and a transmission element; one of said members consisting of a hub having end plates secured thereto, the other of said members consisting of a rim body, a drum fixedly carrying the rim body and having sliding connection with said end plates in radial direction of the wheel, an annular chamber being formed between the drum and the hub, the transmission element consisting of a double conical spring inserted in said chamber with the larger portion secured to one of said members, the smaller ends being secured to the other of said members, an adjusting device for said element including a cup-shield in said chamber and screws carried by one of said plates adapted to axially displace said cup-shield.

3. A shock absorbing transmission for vehicle wheels comprising driving and driven members and a transmission element; one of said members consisting of a hub having fixed end plates, the other of said members consisting of a rim body, a drum being formed in the rim body having radial sliding connection with said end plates and providing an annular chamber around the hub; said transmission element consisting of a conical spring housed in said chamber and having positive connection at its larger and smaller diameters with said members respectively; and adjusting means for said spring within said chamber comprising a spring engaging member and elements adapted to vary the space between said spring engaging member and said plates.

In testimony whereof I affix my signature.

BENJAMIN F. SEYMOUR.